(No Model.)

T. B. BURR.
END GATE FOR VEHICLES.

No. 404,071. Patented May 28, 1889.

WITNESSES:
Phil. C. Dieterich.
C. Sedgwick.

INVENTOR:
T. B. Burr
BY Munn & Co.
ATTORNEYS.

UNITED STATES PATENT OFFICE.

THEODORE B. BURR, OF HARLAN, IOWA.

END-GATE FOR VEHICLES.

SPECIFICATION forming part of Letters Patent No. 404,071, dated May 28, 1889.

Application filed December 31, 1888. Serial No. 295,002. (No model.)

*To all whom it may concern:*

Be it known that I, THEODORE B. BURR, of Harlan, in the county of Shelby and State of Iowa, have invented a new and useful Improvement in End-Gates for Vehicles, of which the following is a full, clear, and exact description.

My invention relates to an improvement in end-gates for vehicles, and has for its object to provide a gate of simple and durable construction, which may be firmly locked in a perpendicular position in contact with a vehicle, and expeditiously and conveniently carried to a horizontal position over the body of the vehicle for dumping the latter, if desired; and also may be made to assume a position for use as a scoop-board without necessitating the operator dismounting from the vehicle.

The invention consists in the novel construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1:
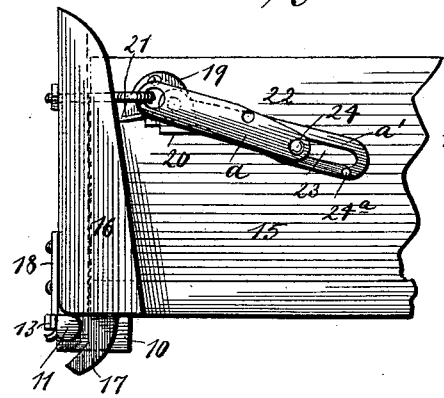
Figure 2:
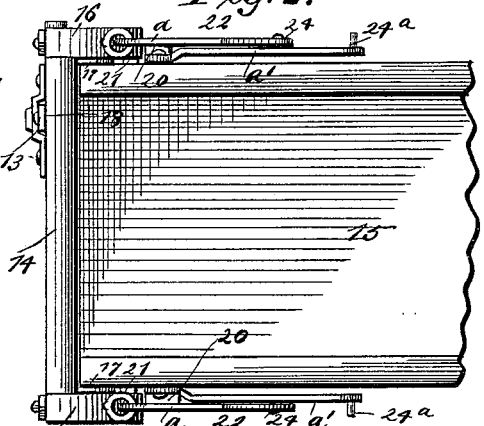
Figure 3:
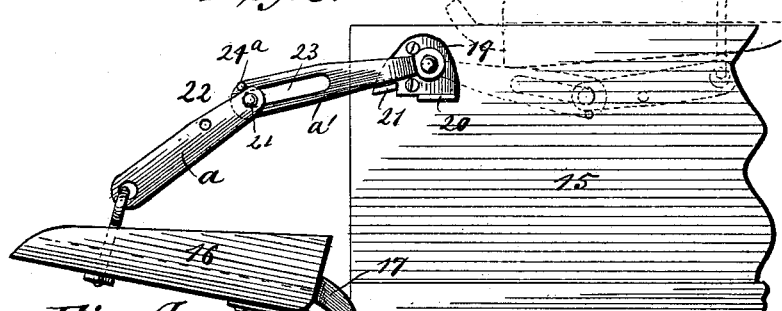
Figure 4:
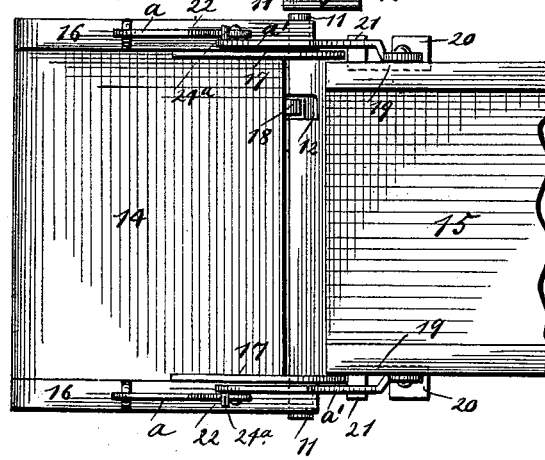
Figure 5:
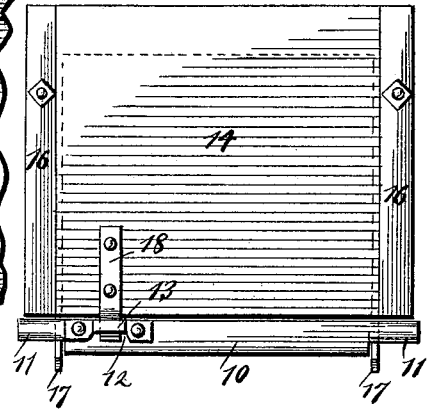

Figure 1 is a partial side elevation of the body of a vehicle, illustrating the end-gate as in a locked position. Fig. 2 is a plan view of the same. Fig. 3 is a partial side elevation of the vehicle-body, illustrating in positive lines the end-gate in position as a scoop-board, and in dotted lines thrown up over the top of the said body. Fig. 4 is a plan view of the end-gate, wherein the position illustrated in Fig. 3 is shown; and Fig. 5 is a rear elevation of the end-gate when closed or locked.

In carrying out the invention a plate or beam, 10, is attached to the bottom of the body at the rear end, which plate extends from side to side and is made to project beyond the end of the body, as best shown in Fig. 3. At each extremity of the plate 10 an attached and preferably integral gudgeon, 11, is formed, as illustrated in Fig. 5, and near each end of the transverse plate or beam 10 a recess, 12, is produced in the outer face, across which recess a strap, 13, is secured, which strap is parallel with the longitudinal axis of the transverse plate 10, as best shown in Fig. 5.

The end-gate 14 is of greater width than the width of the body 15 of the vehicle, and is provided at each end with a side-board, 16, attached to the end-gate at a right angle thereto, the said side-boards being adapted, when the end-gate is closed, to be brought in engagement with the outer face of the side-boards of the vehicle, as illustrated in Fig. 1. The side-boards 16 of the end-gate are preferably made wider at the bottom than at the top. The said upper end of the said side-boards are usually so cut away as to be flush with the upper edge of the end-gate.

To the inner face of each of the side-boards of the end-gate a hinge, 17, is attached, consisting of a strap or bar of metal, curved or straight at the outer end, which outer end projects beyond the lower surface of the end-gate and is adapted to bear upon the gudgeons 11 of the transverse body-plate 10. Another hinge, 18, is secured to the outer face of the end-gate, consisting of a strap or bar of metal made to project below the bottom edge of the said end-gate, and the said projecting end of the hinge is curved to fit in the recess 12 of the body-plate 10 and engage with the strap or keeper 13, spanning the said recess, as best shown in Fig. 5.

A friction-plate, 19, is attached to the side-boards of the vehicle near the top and rear end of the same, which friction-plate is provided at the forward and lower end with an outwardly-extending ear, 20, at a right angle to the side-board, and a second ear, 21, near the rear edge of the said friction-plate, as best illustrated in Fig. 3.

The end-gate is permanently attached to the body of the vehicle by a jointed supporting-bar, 22, one of the said supporting-bars being pivoted upon each friction-plate 19 and to the end-gate at or near the top of the latter. The supporting-bars 22 are composed of two members, $a$ and $a'$. The member $a'$, which is pivoted to the body of the vehicle, is usually provided with a longitudinal slot, 23, in the outer end, and the member $a$, attached to the end-gate, is fitted with a headed stud, 24, adapted to slide in the slot 23, as best shown in Fig. 3. I desire it, however, to be distinctly understood that I do not confine myself to the exact construction of the supporting-bars illustrated, as other equivalent constructions may be employed. For instance, the slot 23 may be dispensed with, and one member of the said supporting-bar be made to slide upon the other in any suitable or approved manner.

When the end-gate is to be used as a scoop-board, it is supported in the inclined open position illustrated in Fig. 3 by reason of the several members of the supporting-bar being fully extended and the end hinges, 17, resting upon the gudgeons 11, together with the hinge 18, bearing upon the strap-plate 13. In order to limit the downward movement of the end-gate when used as a scoop-board, a stop, 24ª, is secured to the outer end of the member $a'$ of the supporting-bar, which stop is made to engage with a bearing upon the upper surface of the member $a$. The supporting-bar is also limited in its downward movement by contact with the ear 21 of the friction-plate. When the end-gate is closed, or carried to a perpendicular position, the member $a$ of the supporting-bars travels upon the other member, $a'$, and the said supporting-bars are thereby elevated at their joint or connection of the members, and as the end-gate approaches the end of the wagon-body the supporting-bars drop by gravity forward, assuming the downwardly-inclined position illustrated in Fig. 1, and supported by contact with the ear 20 of the friction-plate. When the supporting-bars are in this position, the end-gate 14 is securely locked.

If it is desired to entirely uncover the end of the vehicle-body, the supporting-bars are thrown upward to assume a perpendicular position and the end-gate is lifted up bodily, the hinges disengaging from the body-plate 10, and the said end-gate is then carried up to the horizontal position illustrated in dotted lines in Fig. 3, over the wagon-body and made to rest thereon. When the end-gate is in this latter position, the body of the vehicle may be dumped or the contents may be readily removed.

Having thus described my invention, what I claim as new, and desire to secure by Letters Patent, is—

1. The combination, with a vehicle-body, a transverse plate attached to the bottom of the body at the end, provided with a gudgeon at each extremity, and a recess in the outer face near one end and a keeper, 13, spanning said recess, of an end-gate, strap-hinges attached to the said end-gate having a bearing upon the said gudgeons, jointed supporting-bars connecting the body and the end-gate, stops or ears secured to the side-boards of the body adapted to limit the forward and rearward throw of the supporting-bars, and a hinge, 18, secured to the outer face of the end-gate having a detachable bearing upon the keeper of the transverse body-bar, all combined for operation substantially as shown and described.

2. The combination, with a vehicle-body, of an end-gate detachably hinged thereto at its lower edge and jointed supporting-bars sliding one upon the other at their pivotal point and pivoted at their outer ends to the body and end-gate, respectively, substantially as set forth.

3. The combination, with the body having bar 10, and wear-plates 19, provided on their lower edges with front and rear stops, 20 21, of the end-gate having downwardly-projecting straps or projections engaging said bar to rock thereon, and the jointed supporting-bars, the sections $a'$ of which are pivoted to the wear-plate and provided with a slot, 23, the sections $a$ being hinged to the end-gate and provided with pivots extending through slots 23, substantially as set forth.

THEODORE B. BURR.

Witnesses:
L. M. KERR,
JAY WYLAND.